(12) United States Patent
Moreau et al.

(10) Patent No.: US 11,390,548 B2
(45) Date of Patent: Jul. 19, 2022

(54) WATER PURIFICATION AND DISPENSING SYSTEM AND METHOD OF OPERATING SUCH SYSTEM

(71) Applicant: Merck Patent GmbH, Darmstadt (DE)

(72) Inventors: Laurent Moreau, Versailles (FR); Ichiro Kano, Montigny le Bretonneux (FR); Didier Meyer, Paris (FR); Pascal Roitel, Strasbourg (FR)

(73) Assignee: Merck Patent GmbH

( * ) Notice: Subject to any disclaimer, the term of this patent is extended or adjusted under 35 U.S.C. 154(b) by 0 days.

(21) Appl. No.: 16/771,489

(22) PCT Filed: Dec. 11, 2018

(86) PCT No.: PCT/EP2018/084274
§ 371 (c)(1),
(2) Date: Jun. 10, 2020

(87) PCT Pub. No.: WO2019/115490
PCT Pub. Date: Jun. 20, 2019

(65) Prior Publication Data
US 2021/0078886 A1 Mar. 18, 2021

(30) Foreign Application Priority Data
Dec. 14, 2017 (EP) ..................................... 17290163

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/008* (2013.01); *C02F 1/001* (2013.01); *C02F 1/325* (2013.01);
(Continued)

(58) Field of Classification Search
None
See application file for complete search history.

(56) References Cited

U.S. PATENT DOCUMENTS 6,780,328 B1    8/2004  Zhang
2002/0030021 A1*  3/2002  Pappa ..................... C02F 1/725
                                                                     210/748.14
(Continued)

FOREIGN PATENT DOCUMENTS

EP    1431250 A2    6/2004
EP    1814007 A1    8/2007
(Continued)

OTHER PUBLICATIONS

International Search Report and Written Opinion dated Feb. 19, 2019 in corresponding PCT application No. PCT/EP2018/084274.

*Primary Examiner* — Richard C Gurtowski
(74) *Attorney, Agent, or Firm* — Nields, Lemack & Frame, LLC

(57) ABSTRACT

The invention provides a water purification and dispensing system, preferably for producing ultrapure water and offering the purified water at dispensing sites. The system (100) comprises a first purification stage (1) for purifying water to a first water purity grade, a water recirculation loop (2) including a second purification stage (3) for purifying water to a second water purity grade higher than the first purity grade and a dispensing portion (5) for the purified water, and a reservoir (4) arranged to store the water purified at the first purification stage (1) through a first connecting flowpath (7a) and to deliver the stored water to the water recirculation loop (2) through a second connecting flowpath (7b). A 3-way valve (8) is provided in the flowpath between the first purification stage (1) and the reservoir (4) to selectively block the flow of purified water to the reservoir (4) and to drain the purified water from the first purification stage (1). A third connecting flowpath (15) is branched from said dispensing portion (5) and is connected to the first connect- (Continued)

ing flowpath (7a) upstream of an UV radiation treatment device (11).

18 Claims, 2 Drawing Sheets

(51) Int. Cl.
*C02F 1/32* (2006.01)
*C02F 1/469* (2006.01)
*C02F 103/04* (2006.01)

(52) U.S. Cl.
CPC ........ *C02F 1/4695* (2013.01); *C02F 2103/04* (2013.01); *C02F 2201/005* (2013.01); *C02F 2201/3222* (2013.01); *C02F 2301/046* (2013.01); *C02F 2303/04* (2013.01)

(56) References Cited

U.S. PATENT DOCUMENTS

| | | | | |
|---|---|---|---|---|
| 2010/0291502 | A1* | 11/2010 | Knight | C02F 1/32 433/29 |
| 2013/0126430 | A1* | 5/2013 | Kenley | B01D 65/02 210/638 |
| 2014/0124455 | A1* | 5/2014 | Gaignet | C02F 9/005 210/748.11 |

FOREIGN PATENT DOCUMENTS

| | | | |
|---|---|---|---|
| WO | 2012/176134 | A1 | 12/2012 |
| WO | 2013/040420 | A2 | 3/2013 |

* cited by examiner

WATER PURIFICATION AND DISPENSING SYSTEM AND METHOD OF OPERATING SUCH SYSTEM

This invention concerns a water purification and dispensing system, preferably for producing ultrapure water and offering the purified water at one or more dispensing sites in a desired volume, and a method of operating such system.

PRIOR ART

A water purification system of the type to which the present invention pertains aims at producing from tap water preferably ultrapure water and offering the purified water at one or more dispensing sites in a desired volume. Ultrapure water can be defined as the highest quality reagent grade water (ASTM D5127) that exceeds ASTM D1193 type I standards and has a specific resistance of more than 18.0 MΩcm at 25° C. and a total organic carbon (TOC) content of less than five parts per billion (ppb).

Many applications require the use of ultrapure water, in particular in biological and chemical analysis laboratories. The components for purifying water in such a system according to the desired purity level are known as such. An integral water purification system that is designed to purify water from the tap water comprises various water purification means like pre-filtration (sediment filter, activated carbon), reverse osmosis, electro deionization, UV radiation treatment in combination. In order to achieve the purification of tap water to the ultrapure water grade the system typically comprises a first purification stage that is arranged to purify the water from the tap grade to a first purity grade like ASTM D1193 type 2 or lower and a second water purification stage that is arranged to purify the pre-purified water further to a second purity grade that is typically higher than the first purity grade, i.e. a type 1 (ultrapure) water grade. The flow rates through the first water purification stage are typically small, that is why purified water is generally temporarily stored in a reservoir or tank to be dispensed at a higher flow rate afterwards to the second water purification stage according to demand. The second water purification stage can operate at a higher flow rate than the first stage so that the water purified by the second stage can be dispensed for use by the user at a higher flow rate than the production flow rate of the first stage.

Depending on the volume of water required by the respective application or user the purification systems are required to distribute the purified water at or near a maximum treatment capacity and throughput of the second water purification stage, which can be for example, two or three litres per minute, or at a throughput that is lower than the maximum treatment capacity down to a drop-by-drop dispensing rate.

Water purification is a challenge at the ultrapure level. Therefore, the first stage shall be inter alia properly rinsed to avoid contaminants to be released to the reservoir. If contamination occurs this could require a significant time to return to the required high water quality on the ultrapure stage by dispensing larger amounts of water through the second or ultrapure stage or by recirculating the water through the ultrapure stage purification means in a recirculation loop.

FIG. 2 shows a schematic example of a typical integral water purification system and circuitry to which the invention pertains and which is formed of a first purification stage A1 and a second purification stage A2, wherein the second purification stage A2 is included in a water recirculation and dispensing loop B including a dispensing portion with one or more outlet(s) E for the purified water downstream of the second purification stage A2 in the circulation flow direction through the loop. The system example also includes a storage section C with a reservoir arranged to receive and temporarily store the water purified at the first purification stage A1 through a first flowpath for supplying the water from the first purification stage A1 to the reservoir and to deliver the stored water to the water recirculation and dispensing loop B through a second connecting flowpath.

In the example shown in FIG. 2 a reverse osmosis (RO) module and an electro deionization (EDI) module are provided in the first purification or pre-treatment stage (RO/EDI stage). Reverse osmosis is a purification technology that uses a semi-permeable membrane. The typical water quality conductivity is above 5-25 $\rho$S/cm when fed by tap water. In the normal way of operation, the purified water flows from the RO module to the EDI module and further to the reservoir.

Common pre-treatments including EDI modules and RO membranes are known to be "dirty" when new. The RO and EDI module may be replaced in long system life span.

Since any contaminants must not been released into the recirculation and dispensing loop B as they will be very difficult to remove, a first valve V1 is provided to enable a flush sequence to dump the contaminant of the upstream side of the RO membrane to a drain. A second valve V2 is provided to enable a rinsing sequence to dump the contaminant of the downstream side of the RO membrane to the drain. After these sequences, the first purification stage is ready to operate. During normal operation, a reservoir filling sequence is generally necessary after a stand-by period. During that stand by period stagnant water at the downstream side of the RO membrane can be soiled (with ions or organics). A rinsing sequence is done prior to a reservoir filing sequence to dump soiled water to the drain through the second valve V2.

However, any water in the system downstream from the second valve V2 cannot be dumped to the drain. Contaminants on this side of the circuitry will be released into the reservoir.

Further, unless the water purification system is used frequently, i.e. on a daily basis, and in sufficient dispensing volume, the highest water quality cannot be guaranteed after a certain period of idle time because water is not renewed into the reservoir if no water is delivered through the dispensing sites (user consumption) and the first stage of the water purification process does not operate without an additional accessory like a "lab close" accessory that can be implemented and connected to an outlet of the second or ultrapure stage to dump produced water to the drain. The stagnant water can be soiled and will be released to the reservoir when consumption commences again. On the other hand, the optional "lab close" kit is an additional and non-automatic feature that is not convenient to use and can be simply forgotten.

Further, the system is typically installed by a field service engineer (FSE) who should check the complete tightness of the system before releasing the system to the user. Rinsing of the RO membrane in the first purification stage is a long-time process (several hours). During this process water tightness downstream of the second valve V2 cannot be checked. To save time, the rinsing process is often interrupted to check water tightness but soiled water is then released to the reservoir in the meantime.

The second purification stage A2 included in the recirculation and distribution loop B is sometimes referred to as a "polishing stage". In the example this stage includes a deionization (DI) module which can be made with ion exchange materials (beads, textile, polymers etc.) that retain ions and is usually a consumable, and an UV radiation treatment module. The UV radiation treatment module uses a wave length from 170 to 190 nm and is implemented for total organic carbon (TOC) reduction purposes.

Mercury UV technologies can generate wave lengths effective for TOC reduction. However, since for existing reactors having mercury based UV-light sources the handling, manufacturing, repair and disposal of the reactor is subject to strict requirements and to environmental concern, the use of UV-light sources employing Excimer technology in such an UV radiation treatment module is preferred. Further, there is a trend in ultrapure water dispensing systems to arrange the outlet(s) E for the purified water (i.e. the points of dispense) distant from a base unit so that the dispensing and distribution loops are longer and the water quality from a microbial point of view can be hardly guaranteed.

OBJECT OF THE INVENTION

It is therefore an object of the present invention to provide a water purification and dispensing system and a method of operating a water purification and dispensing system that can solve or provide relief with respect to at least some of the above problems and deficiencies and can secure a constant quality of ultrapure water dispensed from the system.

Solution

To solve this problem the invention provides a water purification and dispensing system with the features of claim 1 and a method of operating a water purification and dispensing system including the features of claim 10 or 12. Preferred embodiments of the system and of the method are defined in the dependent claims.

The invention thus provides a water purification and dispensing system comprising a first purification stage for purifying water to a first water purity grade; a water recirculation loop including a second purification stage for purifying water to a second water purity grade that is higher than the first purity grade and a dispensing portion including one or more outlet(s) for the purified water downstream of said second purification stage in the circulation flow direction; and a reservoir arranged to receive and temporarily store the water purified at the first purification stage through a first connecting flowpath for supplying the water from the first purification stage to the reservoir and to deliver the stored water to the water recirculation loop through a second connecting flowpath, wherein a first valve arrangement is provided in the flowpath between the first purification stage and the reservoir and is arranged to selectively block the flow of purified water between (from) the first purification stage and (to) the reservoir and to drain the purified water from the first purification stage. The first purification stage comprises at least an electro-deionisation module for purifying the water and the first valve arrangement is provided downstream of the outlet of the electro-deionisation module. The first valve arrangement is a 3-way valve and an UV radiation treatment device is arranged in the first connecting flowpath for purifying the water downstream of the first valve arrangement and upstream of the reservoir. A third connecting flowpath is branched from said dispensing portion of said water recirculation loop at a position downstream of the one or more outlet(s) in the circulation flow direction and is connected to the first connecting flowpath upstream of the UV radiation treatment device.

The first valve arrangement which is the 3-way valve that is provided in the flowpath between the first purification stage and the reservoir, preferably downstream of the outlet of an EDI module of the first purification stage, enables the water purification means of the first purification stage upstream of the valve arrangement to be active independent from the actual dispensing demands on the recirculation and dispensing loop by producing purified water, preferably automatically, and discharging it directly to the drain. Thus, while the second purification (ultrapure) stage is kept fully operational with its built-in periodic recirculation, the water purification system (from tap to the drain of the first purification stage) can be independently operated, for example in order to "refresh" the first purification stage by producing water to the drain in a situation where the system as such is not used for dispensing ultrapure water for a certain period of time.

In particular, the valve arrangement can be also used to selectively block the communication between the first purification stage and the reservoir so that rinsing operations of the first purification stage to the drain, i.e. prior to a reservoir filling sequence (because of the stagnant water in the RO/EDI devices) and/or in case of a first installation of purification means like the RO device or the EDI module and/or replacements during maintenance, can be performed independent from the operation and/or work on the recirculation and dispensing loop and without the risk that contaminants enter the reservoir.

Although the provision of the first valve arrangement downstream of the first purification stage solves some of the problems leading to a potential transport of contaminants to the reservoir as described above, the water stored in the reservoir is not renewed and that could be an issue after a long period of time and/or distant point(s) of dispense.

The provision of the third connecting flowpath between the first connecting flowpath (connecting the first purification stage with the reservoir) upstream of the reservoir, upstream of the UV radiation treatment device and downstream of the first valve arrangement in addition to the connecting flowpath for discharging the water stored in the reservoir into the recirculation and dispensing loop and in combination with the capability of the first valve arrangement to block the flow further upstream towards the first purification stage allows a "refreshing" of the tank content by recirculation through the UV radiation treatment device upstream of the reservoir and through the polishing device including the radiation treatment device of the second purification stage of the recirculation loop, for example at times where the dispensing frequency and/or volume is not sufficient to prevent stagnation of purified water in the system and/or reservoir. This circulation—either alone or in combination with the refreshing of the first purification stage by producing water to the drain—will enable to keep the water quality at its best level in terms of ion/organic and bacteria concentration even if the system is not used daily. The two different operations can be performed automatically by the system as needed in that the respective valves are operated to create the desired flow patterns through the system.

Since the UV radiation treatment device, preferably in the form of the mercury free UV-C LED radiation treatment device, is provided in the first connecting flowpath downstream of the position where the third connecting flowpath connects to the first connecting flowpath, the circulation of the water from the reservoir and of the water in the recirculation and dispensing loop can be selectively routed through this UV radiation treatment device. Thus, the potential bio contamination due to the distant point(s) of dispense is counterbalanced.

With the provision of the third connecting flowpath and the first valve arrangement as described above two effects can be realized that allow the whole purification system (first stage (pure)/reservoir/second stage (Ultrapure)) to be kept fully operational, preferably automatically, even if not used frequently. The two effects can be combined by implementing the corresponding features in the system together. During installation and maintenance of the system the field service engineer (FSE) can more effectively check and evaluate the global tightness of the system without interrupting the rinsing sequence by simultaneously performing:
- an EDI rinsing in the first purification stage (i.e. creating a water flow from tap to the drain by switching the valve arrangement to block the flow to the reservoir and to open the flow to the drain); and
- a recirculation in the recirculation and dispensing loop (without having to interrupt the first or pure stage rinsing to perform this check).

With the implementation of the UV radiation treatment device downstream of the first valve arrangement and downstream of the connection between the third connecting flowpath and the first connecting flowpath the UV radiation treatment device can typically operate in three different process phases:
- pure water production (from tap to the reservoir—for example from 3 to 15 l/h);
- ultrapure recirculation (from the connection between the second connecting flowpath coming from the reservoir through the second purification stage and the third connecting flowpath to the reservoir—for example about 40 l/h);
- a combination of pure water production and ultrapure recirculation (for example from about 43 to 55 l/h).

Although the most advantages can be obtained by implementing the two effects described above in the same system, the two effects can be used independently and partially by implementing only the corresponding features in a system as desired. The water purification and dispensing system has, as the UV radiation treatment device, preferably a mercury free UV-C radiation treatment device, more preferably an UV-C LED radiation treatment device arranged to emit light in the wavelength range of 260-290 nm, in the first connecting flowpath for purifying the water downstream of the first valve arrangement and upstream of the reservoir. The UV emission power of the UV-C radiation treatment device is preferably adjustable according to the flow rate of water through the UV-C radiation treatment device. With this feature the current applied on the LED light source can be controlled and adapted to the flow rate passing through the UV radiation treatment device depending on the system process: production or recirculation/production and recirculation. This enables an optimal UV dose applied on the water while maximizing the UV light source (LED) life time because the UV emission power is directly linked to the current applied to the UV LED and the UV LED life time is directly correlated to the photon emission surface temperature, which is directly linked to the applied current and thus is directly linked to the flow rate to purify.

The second purification stage preferably comprises at least a polishing filter device and a radiation treatment device for purifying the water, and the radiation treatment device preferably is a radiation treatment device using a xenon dimer $Xe_2$ to give stimulated main emission at 172 nm wavelength.

Preferably a second valve arrangement is arranged to selectively control, preferably allow or block, the flow through the third connecting flowpath.

In order to provide an automatic operation of the first effect realized by the provision of the first valve arrangement the water purification and dispensing system may further comprise a controller arranged to operate the system in a mode in which the first valve arrangement is set to block the flow of purified water from the first purification stage to the reservoir and to drain the purified water from the first purification stage while operating a pump in the first purification stage to drive the water through the first purification stage.

In order to provide the automatic operation of the second effect realized by the provision of the third connecting flowpath the water purification and dispensing system may comprise a controller arranged to operate the system in a recirculation mode in which the first valve arrangement (three-way valve) is set to block the flow of purified water from the first purification stage to the reservoir, and the second valve arrangement is set to allow the flow through the third connecting flowpath while a circulation pump in the water recirculation loop is operated to circulate water through the water recirculation loop and the reservoir.

To automate the operation the controller can be arranged to automatically operate the system in the recirculation mode depending from a detected idle time of the dispensing of water from the dispensing portion and/or a detected dispensing quantity and/or a detected contamination.

Corresponding detectors and/or timer circuits can be implemented in the system to detect the relevant parameters to be evaluated by the controller to activate the elements of the system (valves/pumps) accordingly.

To realize the first effect described above the invention also provides a method of operating a water purification and dispensing system which comprises a first purification stage for purifying water to a first water purity grade; a water recirculation loop including a second purification stage for purifying water to a second water purity grade that is higher than the first purity grade and a dispensing portion including one or more outlet(s) for the purified water downstream of said second purification stage in the circulation flow direction; and a reservoir arranged to receive and temporarily store the water purified at the first purification stage through a first connecting flowpath for supplying the water from the first purification stage to the reservoir and to deliver the stored water to the water recirculation loop through a second connecting flowpath, wherein the method comprises: blocking a flow of purified water from the first purification stage to the reservoir and draining the purified water from the first purification stage while operating a pump in the first purification stage to drive the water through the first purification stage.

The method of operating a water purification and dispensing system may further comprise stopping the draining of purified water from the first purification stage and stopping operating of the pump in the first purification stage; and branching water from said dispensing portion of said water recirculation loop at a position downstream of said one or more outlet(s) in the circulation flow direction, and supplying the branched water to the first connecting flowpath upstream of an UV radiation treatment device arranged in the first connecting flowpath upstream of the reservoir while operating a circulation pump in the water recirculation loop to circulate water through the water recirculation loop, the UV radiation treatment device and the reservoir.

To realize the second effect described above the invention also provides an independent method of operating a water purification and dispensing system which comprises a first purification stage for purifying water to a first water purity grade; a water recirculation loop including a second purification stage for purifying water to a second water purity grade that is higher than the first purity grade and a dispensing portion including one or more outlet(s) for the purified water downstream of said second purification stage in the circulation flow direction; and a reservoir arranged to receive and temporarily store the water purified at the first purification stage through a first connecting flowpath for supplying the water from the first purification stage to the reservoir and to deliver the stored water to the water recirculation loop through a second connecting flowpath, wherein the method comprises: blocking the flow of purified water from the first purification stage to the reservoir, branching water from said dispensing portion of said water recirculation loop at a position downstream of said one or more outlet(s) in the circulation flow direction, and supplying the branched water to the first connecting flowpath upstream of an UV radiation treatment device arranged in the first connecting flowpath upstream of the reservoir while operating a circulation pump in the water recirculation loop to circulate water through the water recirculation loop, the UV radiation treatment device and the reservoir.

The treating of the branched water in the UV radiation treatment device upstream of the reservoir is preferably made by UV-C radiation, preferably in the wavelength range of 260-290 nm.

In order to automate the operation, the circulating of the water through the water recirculation loop and the reservoir can be performed depending from an idle time of the dispensing of water from the dispensing portion and/or a dispensing quantity and/or the detection of a contamination.

BRIEF DESCRIPTION OF THE DRAWINGS

In the following the invention will be described on the basis of one preferred embodiment using the attached drawing as reference.

DETAILED DESCRIPTION OF THE INVENTION

Figure 2:
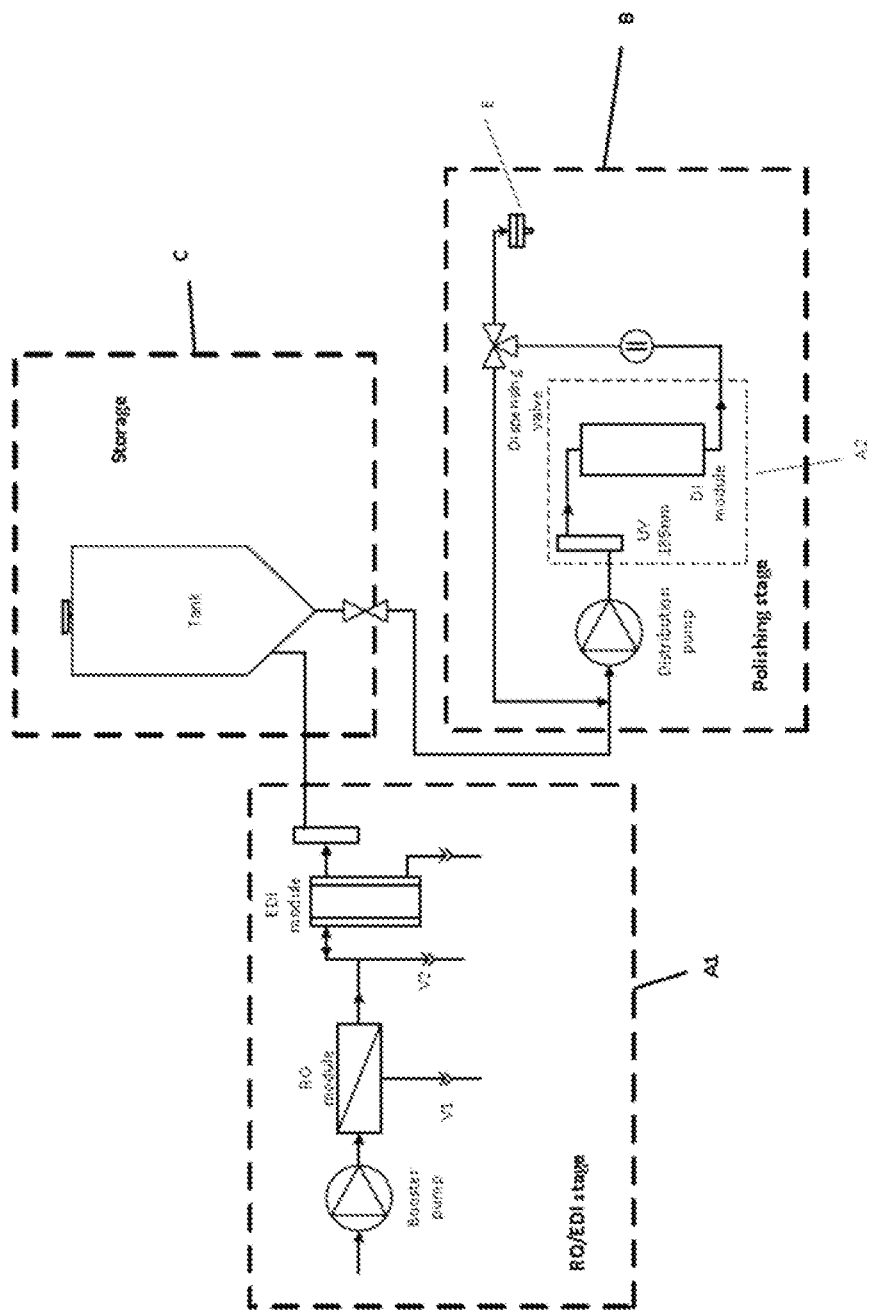
FIG. 2 is a schematic diagram of a typical water purification and dispensing system known in the prior art.

The water purification and dispensing system 100 of the invention shown in FIG. 2 comprises a first purification stage 1 for purifying water to a first water purity grade and a water recirculation and dispensing loop 2 which includes a second purification stage 3 for purifying water to a second water purity grade that is higher than the first purity grade and a dispensing portion 5 including one or more outlet(s) 6 for the purified water downstream of said second purification stage 3 in the circulation flow direction D. The recirculation and dispensing loop 2 will be described in further detail below.

A reservoir 4 is arranged to receive and temporarily store the water purified at the first purification stage 1 through a first connecting flowpath 7a for supplying the water from the first purification stage 1 to the reservoir 4 and to deliver the stored water to the water recirculation loop 2 through a second connecting flowpath 7b.

The first purification stage 1 comprises at least an electro-deionisation (EDI) module 9 for purifying the water and a RO module 19 upstream of the EDI module 9. Further purification means, for example a pre-filter device 17, can be included if required to achieve the desired purity grade at the outlet of the first purification stage using the tap water fed into the stage. A pump 19 is provided in the first purification stage 1 to drive the water through the first purification stage 1.

A first valve arrangement 8 is provided downstream of the outlet of the electro-deionisation module 9 in the flowpath between the first purification stage 1 and the reservoir 4 and it is arranged to selectively block the flow of purified water between (from) the first purification stage 1 and (to) the reservoir 4 and to drain the purified water from the first purification stage 1 to a drain (not shown).

The first valve arrangement 8 is a 3-way valve that is preferably configured to be remotely activated in interaction with a controller to be described later. The first valve arrangement 8 can also be implemented by an arrangement of different valves providing the same or a similar functionality as the 3-way valve.

The water purification and dispensing system 100 further comprises an UV radiation treatment device 11, preferably a mercury free UV-C LED radiation treatment device generating 260-290 nm UV radiation to reduce the bacteria level, in the first connecting flowpath 7a for purifying the water downstream of the first valve arrangement 8 and upstream of the reservoir 4.

The UV emission power of the UV-LED radiation treatment device is preferably adjustable according to the flow rate of water through the UV-LED radiation treatment device. The system may include a controller arranged to perform such adjustment of the UV emission power by automatically controlling the current applied to the UV LED depending on a detected or set flow rate, wherein a low energy level of the radiation may be chosen when the water is not produced, i.e. not recirculated or dispensed, to save energy and to increase the lifetime of the UV-LED radiation treatment device, and a high energy level of the radiation may be chosen during production and distribution according to the water flow rate.

Figure 1:
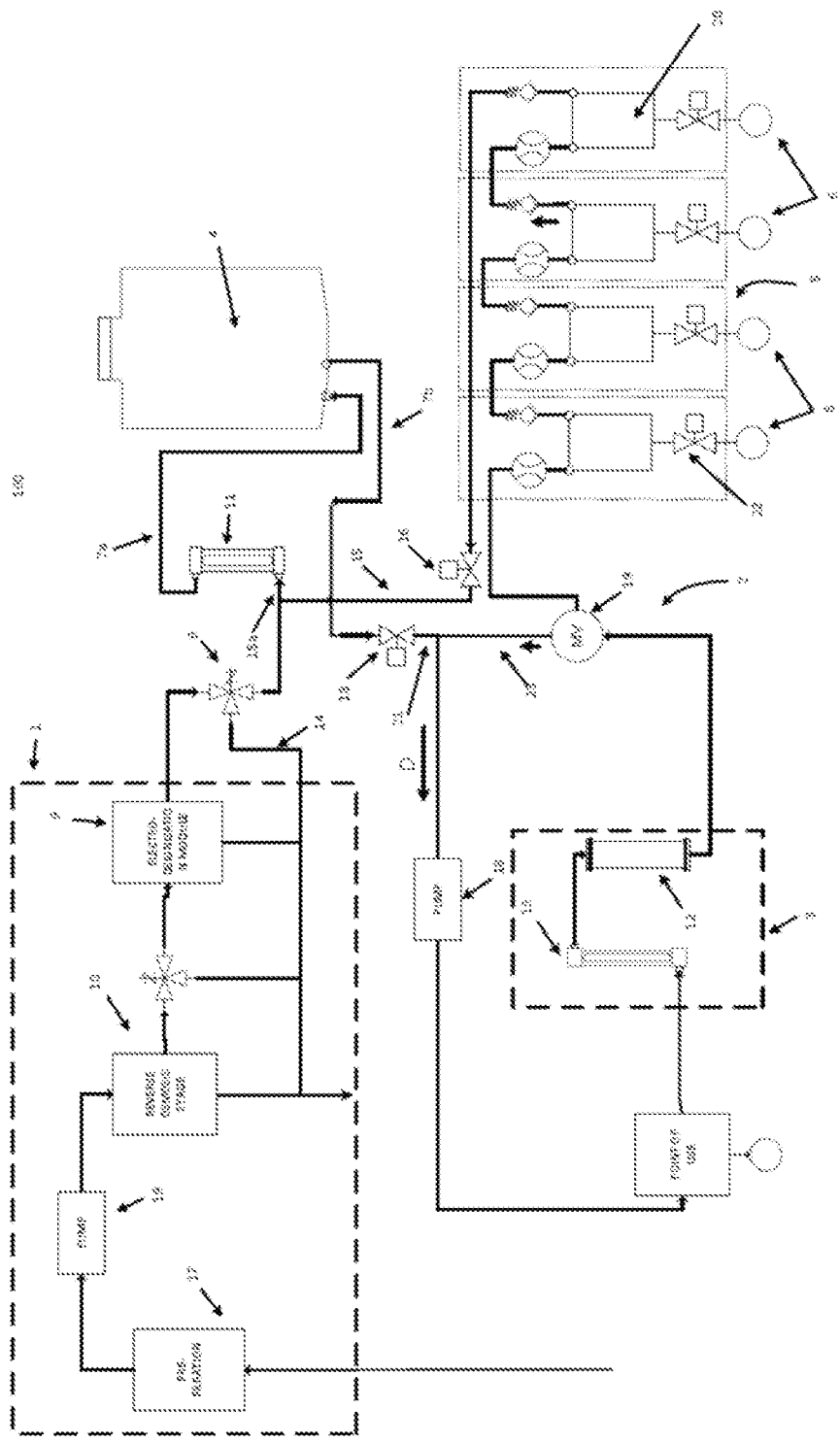
FIG. 1 is a diagram of a preferred embodiment of a water purification and dispensing system according to the invention.

The recirculation and dispensing loop 2 of the water purification and dispensing system 100 of the invention shown in FIG. 1 is, in its basic layout and components, similar to the one disclosed in the document EP 1814007 A1.

The recirculation and dispensing loop 2 accordingly includes a water inlet 21 for introducing water to be purified into the loop 2, a pumping means or pump 18, preferably a motorized pump, for example in the form of a positive displacement type pump, for pumping water through the water recirculation loop 2, thereby defining a preferred flow direction D in the loop, and water purification means forming the second water purification stage 3 for purifying the water downstream of the water inlet 21. The second water purification stage 3 as shown in FIG. 1 includes at least a polishing filter device 12 and an radiation treatment device 13, preferably a radiation treatment device using a xenon dimer $Xe_2$ to give stimulated main emission at 172 nm wavelength capable of reducing the TOC level.

A dispensing portion 5 of the water recirculation loop 2 includes one or more outlet(s) 6 for purified water which are respectively branched off from the water recirculation loop 2 (i.e. from the dispensing portion 5 thereof) downstream of the water purification means of the second water purification stage 3 and, for each of the outlets, a dispensing valve 22 is arranged between each outlet 6 and the water recirculation loop 2 for controlled dispensing of the purified water from the recirculation loop 2 through the respective outlet 6 by operating the respective dispensing valve 22. The structure of the outlets 6 can be preferably similar to the one disclosed in the document EP 1814007 A1.

The dispensing valve(s) 22 is a solenoid valve of the type with a normally closed (NC) flowpath.

The water recirculation loop 2 shown in FIG. 1 thus differs from the one disclosed in EP 1814007 A1 inter alia by the provision of a bypass passage 23 branched from the water recirculation loop 2 and bypassing the dispensing portion 5 of the water recirculation loop 2 including the dispensing valve(s) 22. The bypass passage 23 also includes a valve 19 in the form of a three-way valve for controlling the flow rate through the bypass passage 23 and for controlling the flow rate into the dispensing portion 5 of the water recirculation loop, preferably such that the flow rates are simultaneously controlled in opposite directions by a single activation, i.e. if the flow rate through the bypass passage 23 is increased then the flow rate to the dispensing portion 5 is decreased, preferably in corresponding amounts. The three-way valve 19 of such structure is preferably motorized to allow a precise setting and a remote operation by a controller. Thus, the incoming stream of the recirculation loop 2 downstream of the second water purification stage 3 is split into two streams, one through the bypass passage 23 and one through the dispensing portion 5, and the split ratio can be selectively set by the valve 19.

The water purification and dispensing system 100 shown in FIG. 1 further comprises a third connecting flowpath 15 branched from the water recirculation loop 2 at a position upstream of the position where the second connecting flowpath 7b connects to the recirculation loop 2 in the circulation flow direction D. More precisely, the third connecting flowpath 15 is branched from the dispensing portion 5 of the water recirculation loop 2 at a position downstream of the one or more outlet(s) 6 in the circulation flow direction D and provides a connection to the first connecting flowpath 7a at a position 15a upstream of the reservoir 4 and downstream of the first valve arrangement 8, and more precisely upstream of the UV radiation treatment device 11 which is thus provided in the first connecting flowpath 7a downstream of the position where the third connecting flowpath 15 connects to the first connecting flowpath 7a.

A second valve arrangement 16, preferably in the form of a valve that can be operated by remote control in conjunction with a controller, for example a solenoid valve of the type with a normally closed (NC) flowpath, is arranged to selectively control, preferably allow or block, the flow through the third connecting flowpath 15. In case the second valve arrangement 16 is operated to allow the flow of water from the circulation loop 2 through the third bypass flowpath 15 to the first connecting flowpath 7a while the first valve arrangement 8 is operated to block the flow of purified water from the first purification stage 1 to the reservoir 4, a closed recirculation flowpath is created that allows a circulation of pure water stored in the reservoir 4 and of pure/ultrapure water contained in the recirculation and dispensing loop 2 through the second purification stage 3 without the need to dispense water from the outlet(s) 6.

The system comprises a controller (not shown) for controlling the respective valves and the pumping means and the controller is arranged to perform the various control settings based on predefined programming.

Such controller can be arranged to operate the system in a mode in which the first valve arrangement 8 is set to block the flow of purified water from the first purification stage 1 to the reservoir 4 and to drain the purified water from the first purification stage 1 while operating a pump 19 in the first purification stage 1 to drive the water through the first purification stage 1.

Such a controller can be also arranged to operate the system in a recirculation mode in which the first valve arrangement 8 is set to block the flow of purified water from the first purification stage 1 to the reservoir 4, and the second valve arrangement 16 is set to allow the flow through the third connecting flowpath 15 while a circulation pump 18 in the water recirculation loop 2 is operated to circulate water through the water recirculation and dispensing loop 2 and the reservoir 4. The controller can be arranged to automatically operate the system in the recirculation mode depending from a detected idle time of the dispensing of water from the dispensing portion (5) and/or a detected dispensing quantity and/or a detected contamination. Corresponding detectors and/or timers can be provided in the system to detect the parameters and feed the information to the controller as an input.

In a more general aspect the invention can be applied to any water purification and dispensing system 100 comprising a first purification stage 1 for purifying water to a first water purity grade, a water recirculation loop 2 including a second purification stage 3 for purifying water to a second water purity grade that is higher than the first purity grade and a dispensing portion 5 including one or more outlet(s) 6 for the purified water downstream of said second purification stage 3 in the circulation flow direction D, and a reservoir 4 arranged to receive and temporarily store the water purified at the first purification stage 1 through a first connecting flowpath 7a for supplying the water from the first purification stage 1 to the reservoir 4 and to deliver the stored water to the water recirculation loop 2 through a second connecting flowpath 7b, wherein the invention also comprises a method for operating such a water purification and dispensing system. The method includes, in order to obtain the above described effects and improve the water quality produced by the system by preventing the discharge of contaminants from the first purification stage to the reservoir and allowing simultaneous rinsing of the first purification stage and tightness checks of the recirculation loop after installation and/or maintenance of the system the blocking of a flow of purified water from the first purification stage 1 to the reservoir 4 and the draining the purified water from the first purification stage 1 while operating a pump 19 in the first purification stage 1 to drive the water through the first purification stage 1.

To improve the water quality in case of extended idle times of the system and/or small dispensing amounts and/or long lengths of distribution piping or tubing in the dispensing portion 5 (i.e. where the points of use are distant from a main unit where the components of the purification stage 3 are accommodated) the method further comprises stopping the draining of purified water from the first purification stage 1 and the operation of the pump 19 in the first purification stage 1, and branching water from the dispensing portion 5 of the water recirculation loop 2 at a position downstream of the of the one or more outlet(s) 6 or points of use in the circulation flow direction D, and supplying the branched water to the first connecting flowpath 7a downstream of the first valve arrangement 8 and upstream of the UV radiation treatment device 11 (which is provided upstream of the reservoir 4) while operating a circulation pump 18 in the water recirculation loop 2 to circulate water through the water recirculation loop 2 (including the radiation treatment device 13 thereof), the UV radiation treatment device 11 and the reservoir 4. This method aspect can be utilized in combination with the rinsing of the first purification stage and independent therefrom.

In the method of operating a water purification and dispensing system the circulating of the water through the water recirculation loop 2 and the reservoir 4 can be performed depending from an idle time of the dispensing of water from the dispensing portion 5 and/or a dispensing quantity and/or the detection of a contamination in the pure or ultrapure water.

The invention claimed is:

1. A water purification and dispensing system comprising:
   a first purification stage for purifying water to a first water purity grade;
   a water recirculation loop including a second purification stage for purifying water to a second water purity grade that is higher than the first purity grade and a dispensing portion including one or more outlet(s) for the purified water downstream of said second purification stage in a circulation flow direction; and
   a reservoir arranged to receive and temporarily store the water purified at the first purification stage through a first connecting flowpath for supplying the water from the first purification stage to the reservoir and to deliver the stored water to the water recirculation loop through a second connecting flowpath,
   wherein a first valve arrangement is provided in the first connecting flowpath between the first purification stage and the reservoir and is arranged to selectively block the flow of purified water from the first purification stage to the reservoir and to drain the purified water from the first purification stage,
   wherein the first purification stage comprises at least an electro-deionisation module for purifying the water and the first valve arrangement is provided downstream of an outlet of the electro-deionisation module,
   wherein the first valve arrangement is a 3-way valve, wherein an UV radiation treatment device is arranged in the first connecting flowpath for purifying the water downstream of the first valve arrangement and upstream of the reservoir, and wherein a third connecting flowpath is branched from said dispensing portion of said water recirculation loop at a position downstream of the one or more outlet(s) in the circulation flow direction and is connected to the first connecting flowpath upstream of the UV radiation treatment device.

2. The water purification and dispensing system according to claim 1, wherein the second purification stage comprises at least a polishing filter device and a radiation treatment device for purifying the water.

3. The water purification and dispensing system according to claim 2, wherein the radiation treatment device is a radiation treatment device using a xenon dimer $Xe_2$ to give stimulated main emission at 172 nm wavelength.

4. The water purification and dispensing system according to claim 1, wherein the UV radiation treatment device is an UV-C radiation treatment device.

5. The water purification and dispensing system according to claim 4, wherein the UV-C radiation treatment device is a UV-C LED radiation treatment device arranged to emit light in the wavelength range of 260-290 nm.

6. The water purification and dispensing system according to claim 1, further comprising a second valve arrangement arranged to selectively control the flow through the third connecting flowpath.

7. The water purification and dispensing system according to claim 1, further comprising a controller arranged to operate the system in a mode in which the first valve arrangement is set to block the flow of purified water from the first purification stage to the reservoir and to drain the purified water from the first purification stage while operating a pump in the first purification stage to drive the water through the first purification stage.

8. The water purification and dispensing system according to claim 6, further comprising a controller arranged to operate the system in a recirculation mode in which the first valve arrangement is set to block the flow of purified water from the first purification stage to the reservoir, and the second valve arrangement is set to allow the flow through the third connecting flowpath while a circulation pump in the water recirculation loop is operated to circulate water through the water recirculation loop and the reservoir.

9. The water purification and dispensing system according to claim 8, wherein the controller is arranged to automatically operate the system in the recirculation mode depending from a detected idle time of the dispensing of water from the dispensing portion and/or a detected dispensing quantity and/or a detected contamination.

10. A method of operating a water purification and dispensing system comprising:
    a first purification stage for purifying water to a first water purity grade;
    a water recirculation loop including a second purification stage for purifying water to a second water purity grade that is higher than the first purity grade and a dispensing portion including one or more outlet(s) for the purified water downstream of said second purification stage in a circulation flow direction; and
    a reservoir arranged to receive and temporarily store the water purified at the first purification stage through a first connecting flowpath for supplying the water from the first purification stage to the reservoir and to deliver the stored water to the water recirculation loop through a second connecting flowpath,
    wherein the method comprises:
    blocking a flow of purified water from the first purification stage to the reservoir and draining the purified water from the first purification stage while operating a pump in the first purification stage to drive the water through the first purification stage.

11. The method of operating a water purification and dispensing system according to claim 10, further comprising
    stopping the draining of purified water from the first purification stage and stopping operating of the pump in the first purification stage; and
    branching water from said dispensing portion of said water recirculation loop at a position downstream of said one or more outlet(s) in the circulation flow direction, and supplying the branched water to the first connecting flowpath upstream of an UV radiation treatment device arranged in the first connecting flowpath upstream of the reservoir while operating a circulation pump in the water recirculation loop to circulate water through the water recirculation loop, the UV radiation treatment device and the reservoir.

12. A method of operating a water purification and dispensing system comprising:

a first purification stage for purifying water to a first water purity grade;

a water recirculation loop including a second purification stage for purifying water to a second water purity grade that is higher than the first purity grade and a dispensing portion including one or more outlet(s) for the purified water downstream of said second purification stage in a circulation flow direction; and a reservoir arranged to receive and temporarily store the water purified at the first purification stage through a first connecting flowpath for supplying the water from the first purification stage to the reservoir and to deliver the stored water to the water recirculation loop through a second connecting flowpath, wherein the method comprises:

blocking the flow of purified water from the first purification stage to the reservoir, branching water from said dispensing portion of said water recirculation loop at a position downstream of said one or more outlet(s) in the circulation flow direction, and supplying the branched water to the first connecting flowpath upstream of an UV radiation treatment device arranged in the first connecting flowpath upstream of the reservoir while operating a circulation pump in the water recirculation loop to circulate water through the water recirculation loop, the UV radiation treatment device and the reservoir.

13. The method of operating a water purification and dispensing system according to claim 11, further comprising treating the branched water in the UV radiation treatment device upstream of the reservoir by UV-C radiation.

14. The method of operating a water purification and dispensing system according to claim 11, wherein the circulating of the water through the water recirculation loop and the reservoir is performed depending from an idle time of the dispensing of water from the dispensing portion and/or a dispensing quantity and/or the detection of a contamination.

15. The water purification and dispensing system of claim 4, wherein the UV radiation treatment device is a UV-C LED radiation treatment device.

16. The water purification and dispensing system of claim 4, wherein the UV emission power of the UV-C radiation treatment device is adjustable according to the flow rate of water through the UV-C radiation treatment device.

17. The water purification and dispensing system of claim 6, wherein the second valve arrangement is arranged to allow or block the flow through the third connecting flowpath.

18. The method of claim 13, wherein said UV radiation treatment by UV-C is in the wavelength range of 260-290 nm.

* * * * *